United States Patent
Diffley

(10) Patent No.: US 6,293,278 B1
(45) Date of Patent: Sep. 25, 2001

(54) SOLAR ENERGY COLLECTOR AND EMITTER FOR A SWIMMING POOL

(76) Inventor: William M. Diffley, 140 Milton St., Brooklyn, NY (US) 11222

( * ) Notice: Subject to any disclaimer, the term of this patent is extended or adjusted under 35 U.S.C. 154(b) by 0 days.

(21) Appl. No.: 09/648,128

(22) Filed: Aug. 25, 2000

(51) Int. Cl.$^7$ ........................................ F24J 2/42
(52) U.S. Cl. ............................ 126/564; 126/565
(58) Field of Search ................... 126/561–568; 4/493, 583, 581, 582

(56) References Cited

U.S. PATENT DOCUMENTS

| | | |
|---|---|---|
| D. 304,454 | 11/1989 | Serres . |
| 1,201,256 * | 10/1916 | Clarke ............................ 4/583 |
| 1,534,214 * | 4/1925 | Holt ............................... 4/583 |
| 4,151,617 * | 5/1979 | Kinzel ............................ 4/493 |
| 4,195,622 * | 4/1980 | Dolza ........................... 126/566 |
| 4,206,748 | 6/1980 | Goodman et al. . |
| 4,237,860 | 12/1980 | Caroon . |
| 4,470,404 | 9/1984 | Kremen . |
| 5,347,984 | 9/1994 | Klaren . |
| 5,431,148 | 7/1995 | Kronberg . |

* cited by examiner

*Primary Examiner*—James C. Yeung

(57) ABSTRACT

A solar energy collector and emitter for a swimming pool for utilizing the sun's rays to heat the water of a swimming pool. The solar energy collector and emitter for a swimming pool includes a flat structure assembly having a bottom side and top side and having a thickness and being adapted to be removably fastened to a bottom wall of a swimming pool and being adapted to absorb and emit solar energy for heating the swimming pool; and also includes fastening members securely attached along a perimeter of the bottom side of the flat structure assembly and being adapted to fasten the flat structure assembly to the bottom wall of the swimming pool.

7 Claims, 4 Drawing Sheets

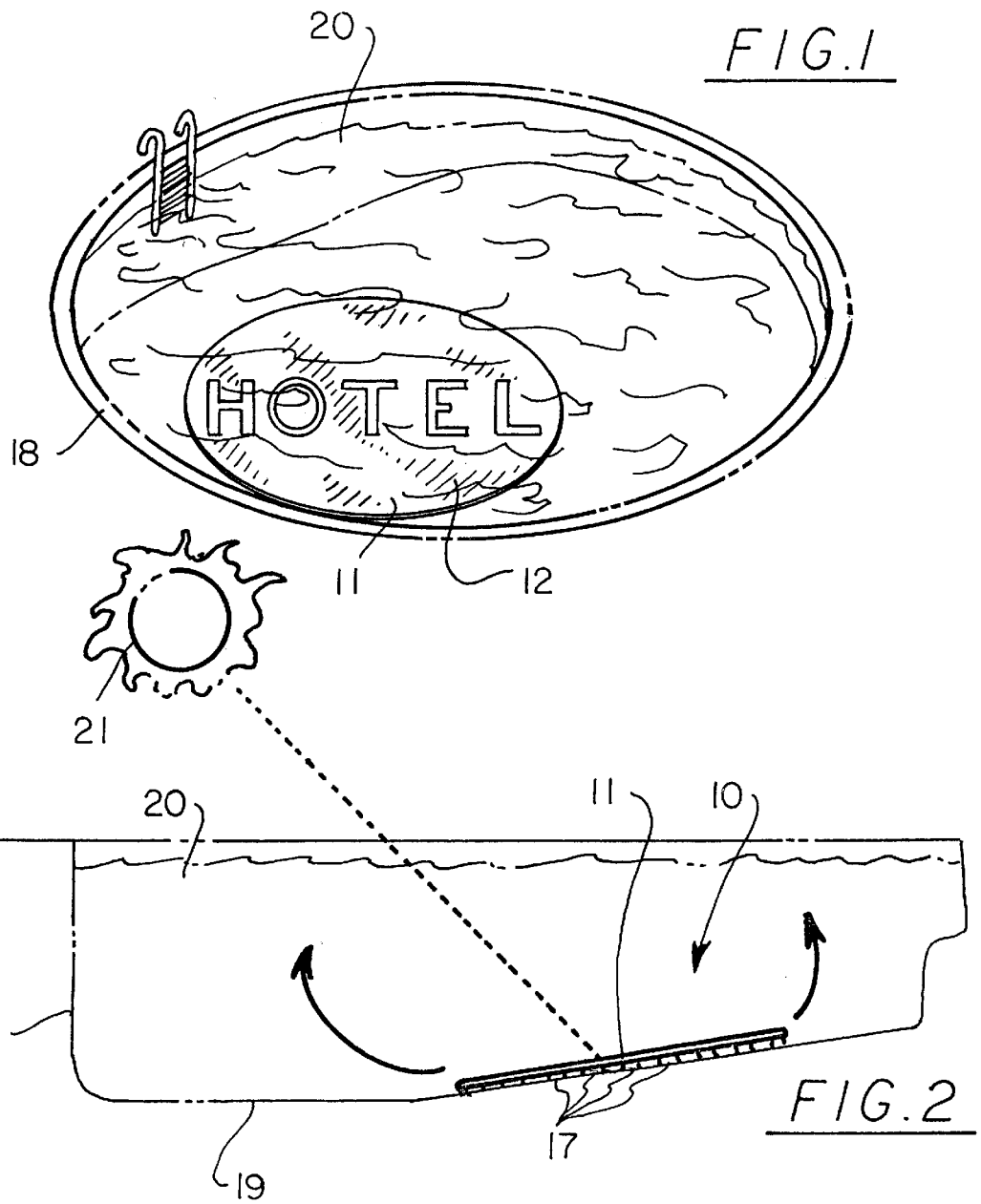

SOLAR ENERGY COLLECTOR AND EMITTER FOR A SWIMMING POOL

BACKGROUND OF THE INVENTION

1. Field of the Invention

The present invention relates to a solar dot device and more particularly pertains to a new solar energy collector and emitter for a swimming pool for utilizing the sun's rays to heat the water of a swimming pool.

2. Description of the Prior Art

The use of a solar dot device is known in the prior art. More specifically, a solar dot device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,431,148; 4,470,404; 4,237,860; 4,206,748; U.S. Pat. No. Des. 304,454; and U.S. Pat. No. 5,347,984.

While these devices fulfill their respective, particular objectives and requirements, the aforementioned patents do not disclose a new solar energy collector and emitter for a swimming pool. The inventive device includes a flat structure assembly having a bottom side and top side and having a thickness and being adapted to be removably fastened to a bottom wall of a swimming pool and being adapted to absorb and emit solar energy for heating the swimming pool; and also includes fastening members securely attached along a perimeter of the bottom side of the flat structure assembly and being adapted to fasten the flat structure assembly to the bottom wall of the swimming pool.

In these respects, the solar energy collector and emitter for a swimming pool according to the present invention substantially departs from the conventional concepts and designs of the prior art, and in so doing provides an apparatus primarily developed for the purpose of utilizing the sun's rays to heat the water of a swimming pool.

SUMMARY OF THE INVENTION

In view of the foregoing disadvantages inherent in the known types of solar dot device now present in the prior art, the present invention provides a new solar energy collector and emitter for a swimming pool construction wherein the same can be utilized for utilizing the sun's rays to heat the water of a swimming pool.

The general purpose of the present invention, which will be described subsequently in greater detail, is to provide a new solar energy collector and emitter for a swimming pool which has many of the advantages of the solar dot device mentioned heretofore and many novel features that result in a new solar energy collector and emitter for a swimming pool which is not anticipated, rendered obvious, suggested, or even implied by any of the prior art solar dot device, either alone or in any combination thereof.

To attain this, the present invention generally comprises a flat structure assembly having a bottom side and top side and having a thickness and being adapted to be removably fastened to a bottom wall of a swimming pool and being adapted to absorb and emit solar energy for heating the swimming pool; and also includes fastening members securely attached along a perimeter of the bottom side of the flat structure assembly and being adapted to fasten the flat structure assembly to the bottom wall of the swimming pool.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar energy collector and emitter for a swimming pool which has many of the advantages of the solar dot device mentioned heretofore and many novel features that result in a new solar energy collector and emitter for a swimming pool which is not anticipated, rendered obvious, suggested, or even implied by any of the prior art solar dot device, either alone or in any combination thereof.

It is another object of the present invention to provide a new solar energy collector and emitter for a swimming pool which may be easily and efficiently manufactured and marketed.

It is a further object of the present invention to provide a new solar energy collector and emitter for a swimming pool which is of a durable and reliable construction.

An even further object of the present invention is to provide a new solar energy collector and emitter for a swimming pool which is susceptible of a low cost of manufacture with regard to both materials and labor, and which accordingly is then susceptible of low prices of sale to the consuming public, thereby making such solar energy collector and emitter for a swimming pool economically available to the buying public.

Still yet another object of the present invention is to provide a new solar energy collector and emitter for a swimming pool which provides in the apparatuses and methods of the prior art some of the advantages thereof, while simultaneously overcoming some of the disadvantages normally associated therewith.

Still another object of the present invention is to provide a new solar energy collector and emitter for a swimming pool for utilizing the sun's rays to heat the water of a swimming pool.

Yet another object of the present invention is to provide a new solar energy collector and emitter for a swimming pool which includes a flat structure assembly having a bottom side and top side and having a thickness and being adapted to be removably fastened to a bottom wall of a swimming pool and being adapted to absorb and emit solar energy for heating the swimming pool; and also includes fastening members securely attached along a perimeter of the bottom side of the flat structure assembly and being adapted to fasten the flat structure assembly to the bottom wall of the swimming pool.

Still yet another object of the present invention is to provide a new solar energy collector and emitter for a swimming pool that be effectively used even while swimmers are using the swimming pool.

Even still another object of the present invention is to provide a new solar energy collector and emitter for a swimming pool that prevents swimmers from getting their feet caught under the flat structure assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top plan view of a new solar energy collector and emitter for a swimming pool according to the present invention and shown in use in swimming pool.

FIG. 2 is a side elevational view of the present invention shown in use in a swimming pool.

FIG. 7 is a top plan view of the circulation of the water in the swimming pool with the circulating pumps being turned on.

FIG. 8 is a side elevational view of the circulation of the water in the swimming pool with the circulating pumps being turned on.

DESCRIPTION OF THE PREFERRED EMBODIMENT

Figure 3:
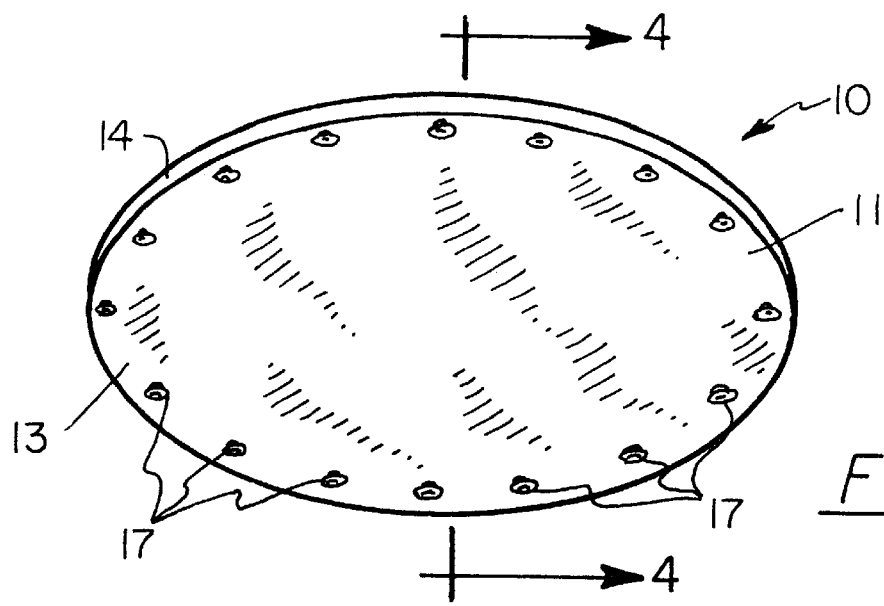
FIG. 3 is a bottom perspective view of the present invention.
Figure 4:
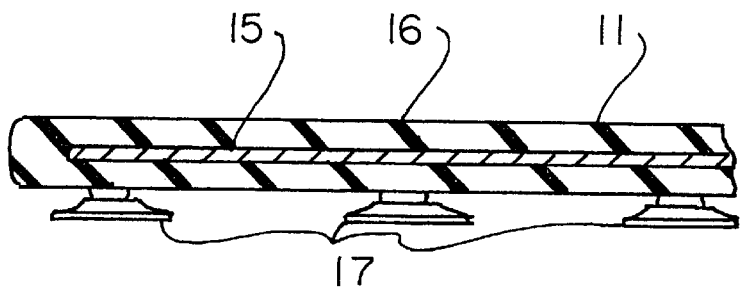
FIG. 4 is a cross-sectional view of the second embodiment of the present invention.
Figure 5:
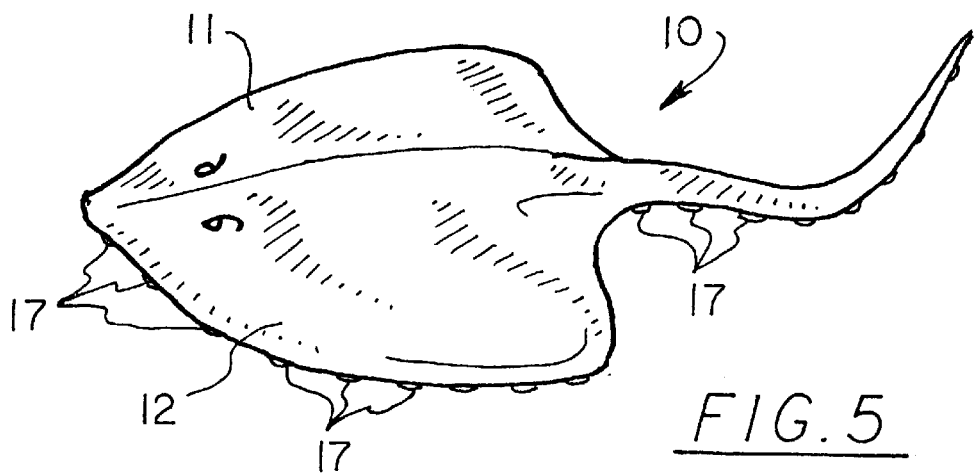
FIG. 5 is a top perspective view of the present invention being shaped like that of a sting-ray.

With reference now to the drawings, and in particular to FIGS. 1 through 8 thereof, a new solar energy collector and emitter for a swimming pool embodying the principles and concepts of the present invention and generally designated by the reference numeral 10 will be described.

As best illustrated in FIGS. 1 through 8, the solar energy collector and emitter for a swimming pool 10 generally comprises a flat structure assembly 11 having a bottom side 13 and top side 12 and having a thickness and being either disc-shaped or polygonal shaped with the shape being that of sea creatures such as sting-rays and also being adapted to be removably fastened to a bottom wall 19 of a swimming pool 18 and being adapted to absorb and emit solar energy for heating the water 20 of the swimming pool 18. The flat structure assembly 11 has a beveled edge 14 and is dimensioned to cover approximately one-third to one-half of the bottom wall 19 of the swimming pool 18. The flat structure assembly 11 is essentially colored with a flat black for effectively and efficiently absorbing solar energy and for effectively transferring heat to the water 20 about the flat structure assembly 11. The thickness of the flat structure assembly 11 is approximately ⅛ to ¼ inch. Fastening members 17 are securely and conventionally attached along a perimeter or edge 14 of the flat structure assembly 11 and is adapted to fasten the flat structure assembly 11 to the bottom wall 19 of the swimming pool 18 with the fastening members 17 being essentially suction cups 17 which are securely attached to and spaced along the bottom side 13 thereof.

As a first embodiment, the flat structure assembly 11 is essentially made of a gasket material which is reinforced with nylon.

As a second embodiment, the flat structure assembly 11 includes a flat body member 15 having a coating 16 disposed thereabout with the flat body member 15 being made of a material selected from a group consisting of metal and plastic and with the coating 16 being made of a rubberized material.

Figure 6:
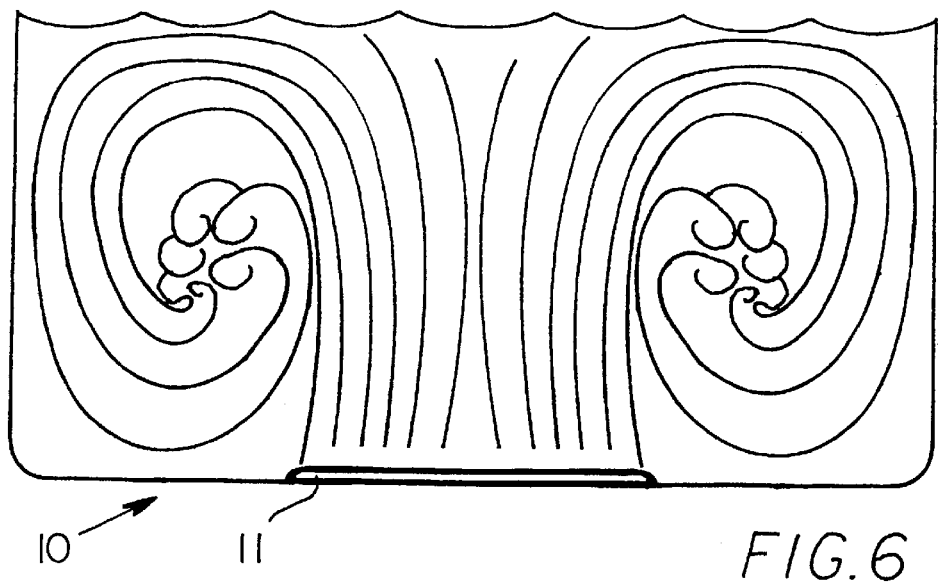
FIG. 6 is a side elevational view of the circulation of the water in the swimming pool with the circulating pumps being turned off.
Figure 7:
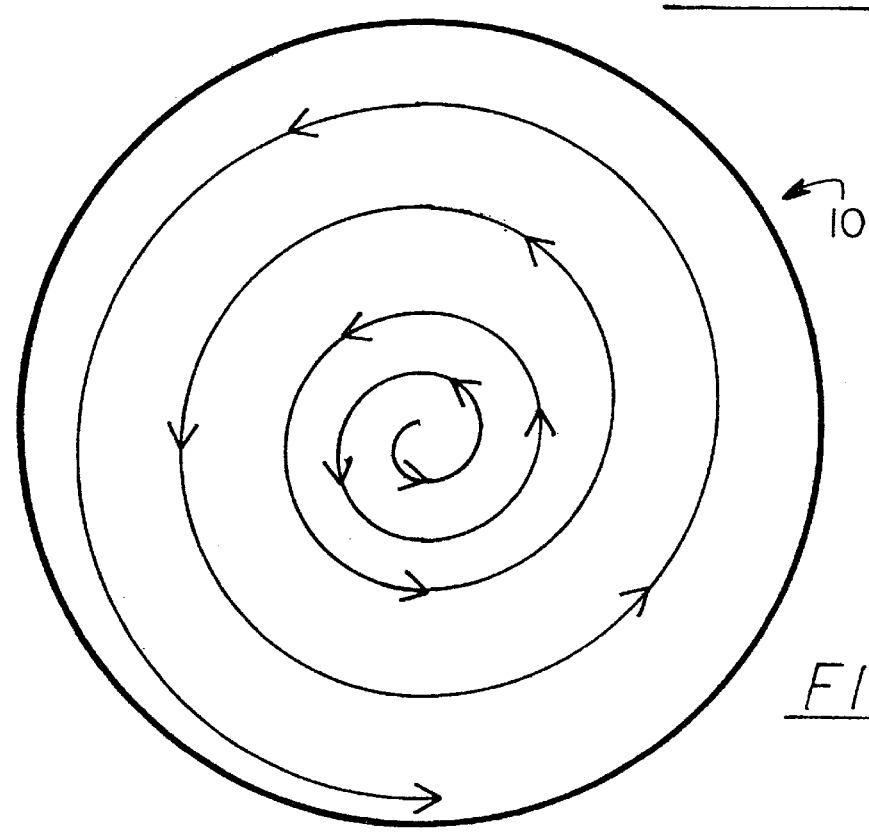
Figure 8:
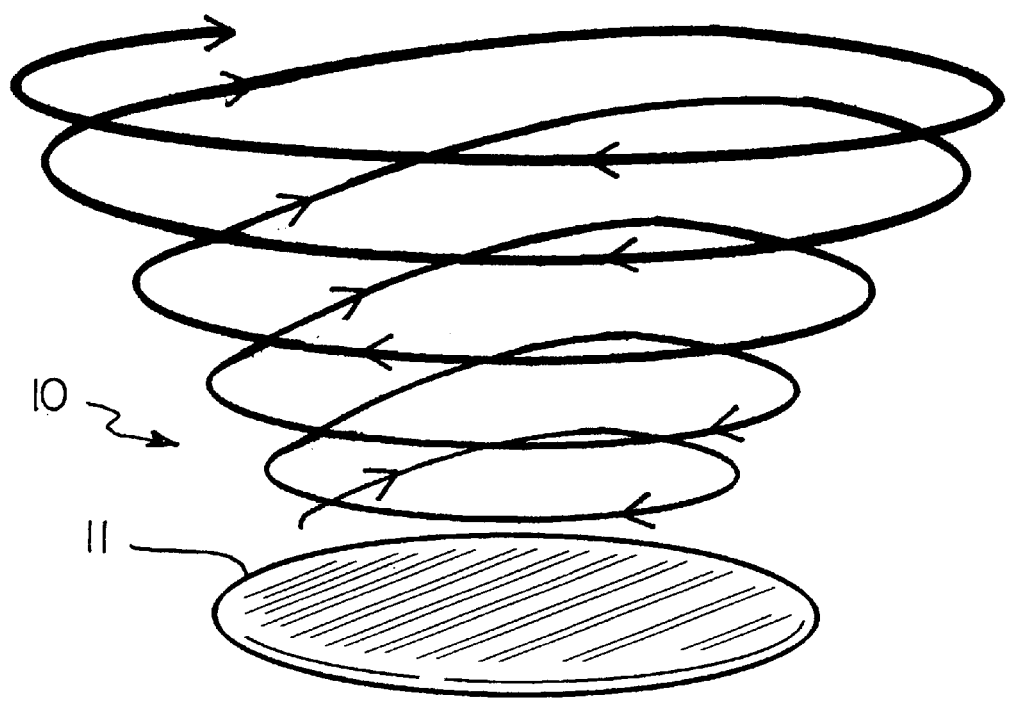

In use, the user securely attaches the flat structure assembly 11 to the bottom wall 19 of the swimming pool 18 to allow the rays of the sun 21 to be absorbed by the flat structure assembly 1 and transferred to the water 20 about the flat structure assembly 11 in the various circulation patterns with and without the circulating pump being turned on as shown in FIGS. 6–8.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar energy collector and emitter for a swimming pool comprising:
   a flat structure assembly having a bottom side and top side and having a thickness and being adapted to be removably fastened to a bottom of a swimming pool and being adapted to absorb solar energy passing through water in said swimming pool and then emit said solar energy into said water for heating the water in the swimming pool;

fastening members mounted on said flat structure along a perimeter of said bottom side and being adapted to fasten said flat structure assembly to the bottom wall of the swimming pool;

wherein said flat structure assembly is essentially colored with a flat black color for facilitating absorption of solar energy while minimizing reflection of said solar energy to maximize heat transfer to the water about said flat structure assembly;

wherein said flat structure assembly has beveled edge;

wherein said thickness of said flat structure assembly is approximately 1/8 to 1/4 inch;

wherein said fastening members are suction cups which are securely attached to and spaced along said bottom side thereof;

wherein said flat structure assembly is essentially made of a gasket material which is reinforced with nylon;

wherein said flat structure assembly includes a flat body member having a coating disposed thereabout;

wherein said flat body member is made of a material selected from a group consisting of metal and plastic; and wherein said coating is made of rubberized material.

2. A solar energy collector and emitter for a swimming pool comprising:

a flat structure assembly having a polygonal shape and having a bottom side and top side and having a thickness and being adapted to be removably fastened to a bottom of a swimming pool and being adapted to absorb and emit solar energy for heating the swimming pool, said flat structure assembly having a beveled edge, said flat structure assembly being dimensioned to cover approximately one-third to one-half of the bottom wall of the swimming pool, said flat structure assembly being essentially colored with a flat black for effectively and efficiently absorbing solar energy and for effectively transferring heat to the water about said flat structure assembly, said thickness of said flat structure assembly being approximately 1/8 to 1/4 inch; and fastening members securely attached along a perimeter of said bottom side of said flat structure assembly and being adapted to fasten said flat structure assembly to the bottom wall of the swimming pool, said fastening members being essentially suction cups which are securely attached to and spaced along said bottom side thereof.

3. A solar energy collector and emitter for a swimming pool as described in claim 2, wherein said flat structure assembly is essentially made of a gasket material which is reinforced with nylon.

4. A solar energy collector and emitter for a swimming pool as described in claim 2, wherein said flat structure assembly includes a flat body member having a coating disposed thereabout, said flat body member being made of a material selected from a group consisting of metal and plastic, said coating being made of a rubberized material.

5. The solar energy collector and emitter of claim 2, wherein said polygonal shape comprises a disc-shape.

6. The solar energy collector and emitter of claim 2, wherein said polygonal shape comprises a shape like that of a sea creature.

7. In combination:

a swimming pool having a bottom wall; and a solar energy collector and emitter comprising:

a flat structure having a bottom side and top side and having a thickness and being adapted to be removably fastened to a bottom wall of a swimming pool and being adapted to absorb solar energy passing through water in said swimming pool and then emit said solar energy into said water for heating the water in the swimming pool; and fastening members mounted on said flat structure along a perimeter of said bottom side of said flat structure and being adapted to fasten said flat structure to the bottom wall of the swimming pool;

wherein said flat structure is dimensioned to cover approximately one-third to one-half of the bottom wall of the swimming pool;

wherein said flat structure is orientated substantially parallel to said bottom of said pool; and wherein said fastening members space said flat structure away from said bottom wall of said swimming pool.

* * * * *